US007044017B2

(12) United States Patent
Cornelius et al.

(10) Patent No.: US 7,044,017 B2
(45) Date of Patent: May 16, 2006

(54) ROLLER SCREW SYSTEM

(76) Inventors: Charles C. Cornelius, 735 - 1st S, Apt. 202, Kirkland, WA (US) 98033; Shawn P. Lawlor, 3022 - 137th Ave. NE., Bellevue, WA (US) 98005

( * ) Notice: Subject to any disclaimer, the term of this patent is extended or adjusted under 35 U.S.C. 154(b) by 101 days.

(21) Appl. No.: 10/458,050

(22) Filed: Jun. 9, 2003

(65) Prior Publication Data

US 2004/0244520 A1 Dec. 9, 2004

(51) Int. Cl.
*F16H 1/18* (2006.01)
*F16H 1/20* (2006.01)

(52) U.S. Cl. .............................. 74/424.88; 74/424.81; 74/424.82; 74/424.92

(58) Field of Classification Search ............. 74/412 R, 74/424.71, 424.74, 424.75, 424.81, 424.82, 74/424.88, 424.89, 242.91, 424.92
See application file for complete search history.

(56) References Cited

U.S. PATENT DOCUMENTS 2,683,379 A * 7/1954 Strandgren ............... 74/424.92
3,595,094 A * 7/1971 Lemor ....................... 74/89.14
3,726,151 A 4/1973 Lemor ....................... 74/424.8
3,744,332 A 7/1973 Nilsson ..................... 74/424.8
3,884,090 A * 5/1975 Dock ...................... 74/424.92
4,050,319 A 9/1977 Stanley ...................... 74/89.15
4,375,770 A * 3/1983 Druet ...................... 74/424.92
4,884,466 A 12/1989 Duruisseau ................ 74/424.8
5,809,837 A 9/1998 Shaffer ...................... 74/424.8
6,170,351 B1 * 1/2001 Zernickel ................ 74/424.92

* cited by examiner

*Primary Examiner*—Richard W. Ridley
*Assistant Examiner*—Colby Hansen
(74) *Attorney, Agent, or Firm*—Dean A. Craine

(57) ABSTRACT

A higher efficiency roller screw system that includes a nut body designed to engage a threaded shaft. The nut body includes a center bore with closed, partial helical grooves formed therein. Disposed inside the center bore is a shaft with open helical threads formed thereon. A plurality of rollers with non-helical grooves formed thereon are also disposed inside the nut body's center bore and longitudinally aligned with the shaft. The grooves on each roller are designed to engage the grooves on the nut body and the threads on the shaft. The nut body includes a cross-over region where the trajectory of the internal grooves extend radially outward and axially. When the rollers' grooves contact the grooves in the cross-over region, the rollers are forced outward to maintain contact with the grooves on the nut body and are deflected axially. When they move outward, they disengage from the helical threads on the shaft. As the nut body continues to rotate, the grooves on the rollers maintain contact with the grooves on the nut body and re-engage the helical threads on the shaft.

18 Claims, 10 Drawing Sheets

12
34
50
A
B
C
D
E
F
G
H
I
J
K
X
Y
Z

ROLLER SCREW SYSTEM

BACKGROUND OF THE INVENTION

1. Field of the Invention

The present invention relates generally to the field of devices used for converting rotary motion into linear motion.

2. Description of the Related Art

The key functional element in all roller-screw systems, including the present system, is that the rotary motion of the shaft or roller-nut is converted into an axial force through the operation of the roller-nut on the shaft. The efficiency of that process is much greater than in the case of a conventional threaded shaft/nut system because of the inclusion of the rollers that are in rolling contact with both the shaft and the nut as opposed to sliding contact. Thus in the case of a properly operating roller-nut, axial force is created through machine elements that are in rolling contact with each other, as opposed to sliding contact in the case of a conventional nut/shaft system with a corresponding reduction in drag. This results in a significant increase in efficiency for a roller-screw system as compared to a conventional nut/shaft system.

In the present case, the high efficiency operation is achieved with elements that are less costly to manufacture and easier to assemble than in other high efficiency and roller-screw systems currently available.

SUMMARY OF THE INVENTION

It is an object of the present invention to provide a more efficient roller screw system used to convert rotary motion into linear motion.

Disclosed herein is an improved roller screw system that uses a nut body which includes a plurality of longitudinally aligned rollers located between the interior grooved surface of the nut body and designed to remain in constant contact with the grooves located on the interior surface of the nut body during operation. The rollers, however, are able to shift axially and be re-positioned with respect to both the nut body and the shaft as the nut body or shaft are rotated while they remain constantly in rolling contact with the nut body.

The grooves on the nut body are helical over most of the inside surface of the nut body. Over a small region of the inside surface of the center bore, hereinafter referred to as the cross-over region, the grooves extend radially outward and axially. Located inside the nut body is a plurality of longitudinally aligned rollers. Formed over the outer surface of the rollers are non-helical grooves that mesh with a plurality of closed, partially helical grooves on the nut body and with the helical threads on the shaft that extends through the nut body. When the rollers travel through the cross-over region, two compression rings located on the opposite ends of the rollers force the rollers radially outward so that they maintain engagement with the grooves on the nut body. Because the grooves in the cross-over region extend axially, the rollers are shifted axially with respect to the nut body and shaft when centrally disposed in the cross-over region. As the rollers leave the cross-over region, they are extended axially and returned to the original starting point of the grooves on the nut body.

The grooves on the rollers are non-helical and designed to engage both the closed grooves on the nut body and on the open helical threads on the shaft. The diameter of the nut body, the shaft, and the rollers are sufficient in size so that when the grooves on the rollers engage the grooves on the nut body in the cross-over region, they progressively disengage from the helical threads on the shaft thereby enabling the rollers to move axially with respect to the nut body. As the rollers leave the cross-over region, they travel axially and re-engage the helical threads on the shaft. With each rotation of the nut body over the shaft, the rollers are in constant rolling contact with the grooves on the nut body.

There are two approaches for insuring that the rollers remain in full contact and engagement with the nut body grooves while they progress through the cross-over region of the nut grooves. In the first approach, compression rings are included at each end of the assembly that act on the roller axles on each end of each roller. Because the compression rings are in rolling contact with the axles on the ends of the rollers and the rollers rotate along the grooves of the nut body and the threads of the shaft, the frictional forces between the nut body and shaft are substantially reduced.

In the second approach for insuring that the rollers remain in full contact and engagement with the grooves in the nut body as they progress through the cross-over region, a non-moving end-cover is attached over each end of the nut body that incorporates a lobed or cam shape that pushes radially outward on the axle included on each end of each of the rollers. In order to reduce the friction between the rotating axle and the non-rotating cam lobe, low friction bushings or roller bearings may be included with the roller axles.

DESCRIPTION OF THE PREFERRED EMBODIMENT(S)

Figure 1:
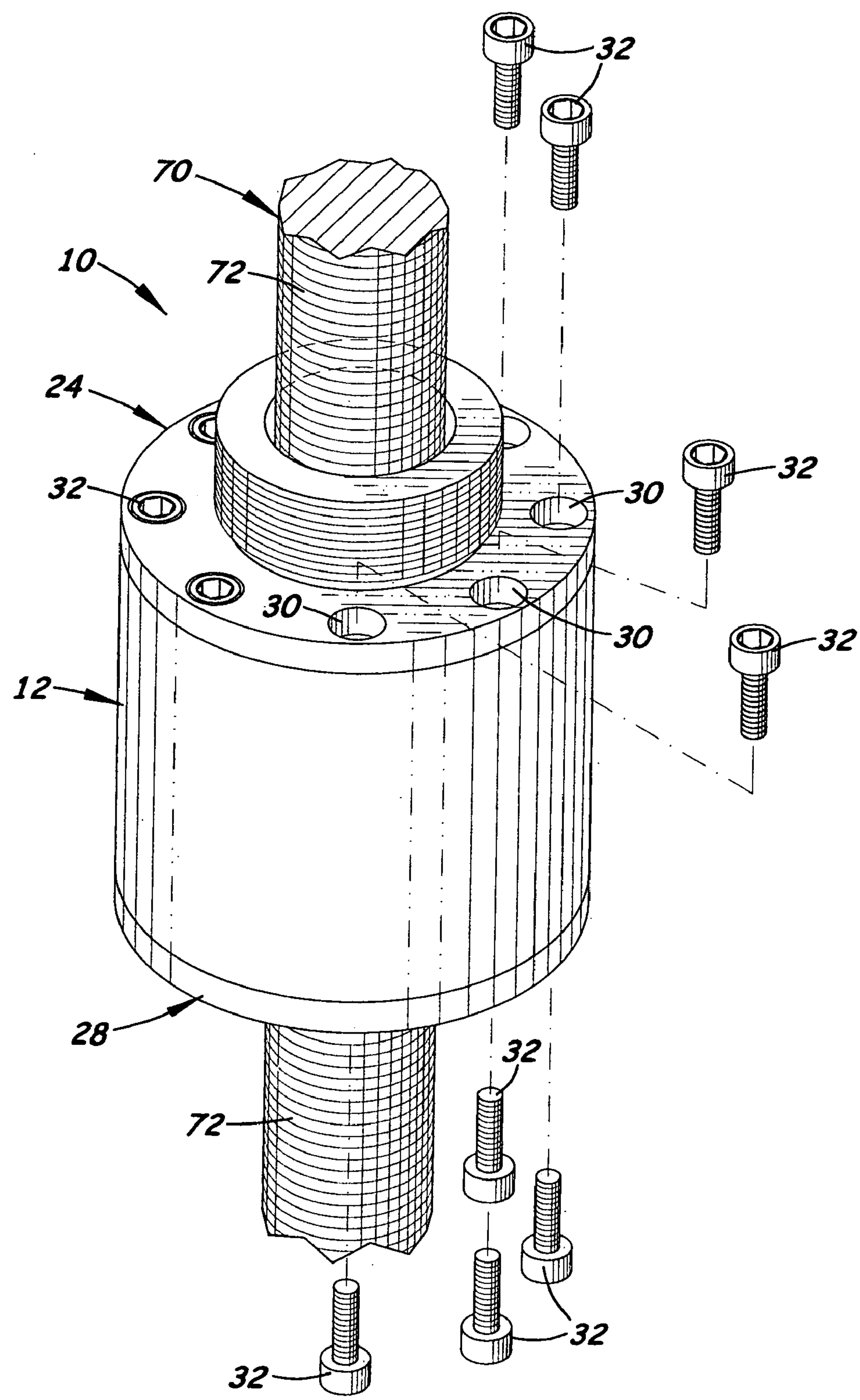
FIG. 1 is a perspective view of the first embodiment of the roller screw system disclosed herein.

Shown in the accompanying Figs., there is shown an improved roller screw system 10 that uses a nut body 12 which includes a plurality of rollers 34 located therein designed to remain in constant contact with the partially, helical, closed grooves 20 located on the interior surface of the nut body 12 and yet allow the rollers 34 to shift axially with respect to both the nut body 12 and the shaft 70 as the nut body 12 or shaft 70 are rotated. These grooves 20 on the nut body 12 maintain their purely helical trajectory over most of the circumference. Over a local circumferential region, hereinafter referred to as the cross-over region 40, the trajectory of the grooves 20 change to extend radially outward and axially to return to the original starting point, thus forming a closed groove. When the rollers 34 travel through the cross-over region 40, they move radially outward and shift axially with respect to both the nut body 12 and the shaft 70. When the rollers 34 leave the cross-over region 40, they are shifted axially and re-engage the starting point of helical region of the grooves 20. As the nut body 12 or shaft 70 rotates, the rollers 34 constantly remain in rolling contact and engagement with the nut body grooves 20.

When the rollers 34 engage the helical region of the grooves 20 on the nut body 12, they also completely engage in the helical threads 72 of the shaft 70. When the rollers 34 travel through the cross-over region 40, they progressively disengage from the threads 72 in the shaft 70 thereby enabling the cross-over region 40 to shift the rollers 34 axially. When the rollers 34 are completely disengaged from the threads 72 in the shaft 70, the grooves 42 shown in FIG. 4 in the cross-over region 40 shift the rollers 30 longitudinally so that roller 34 may re-engage the adjacent threads 72 on the shaft 70.

Figure 2:
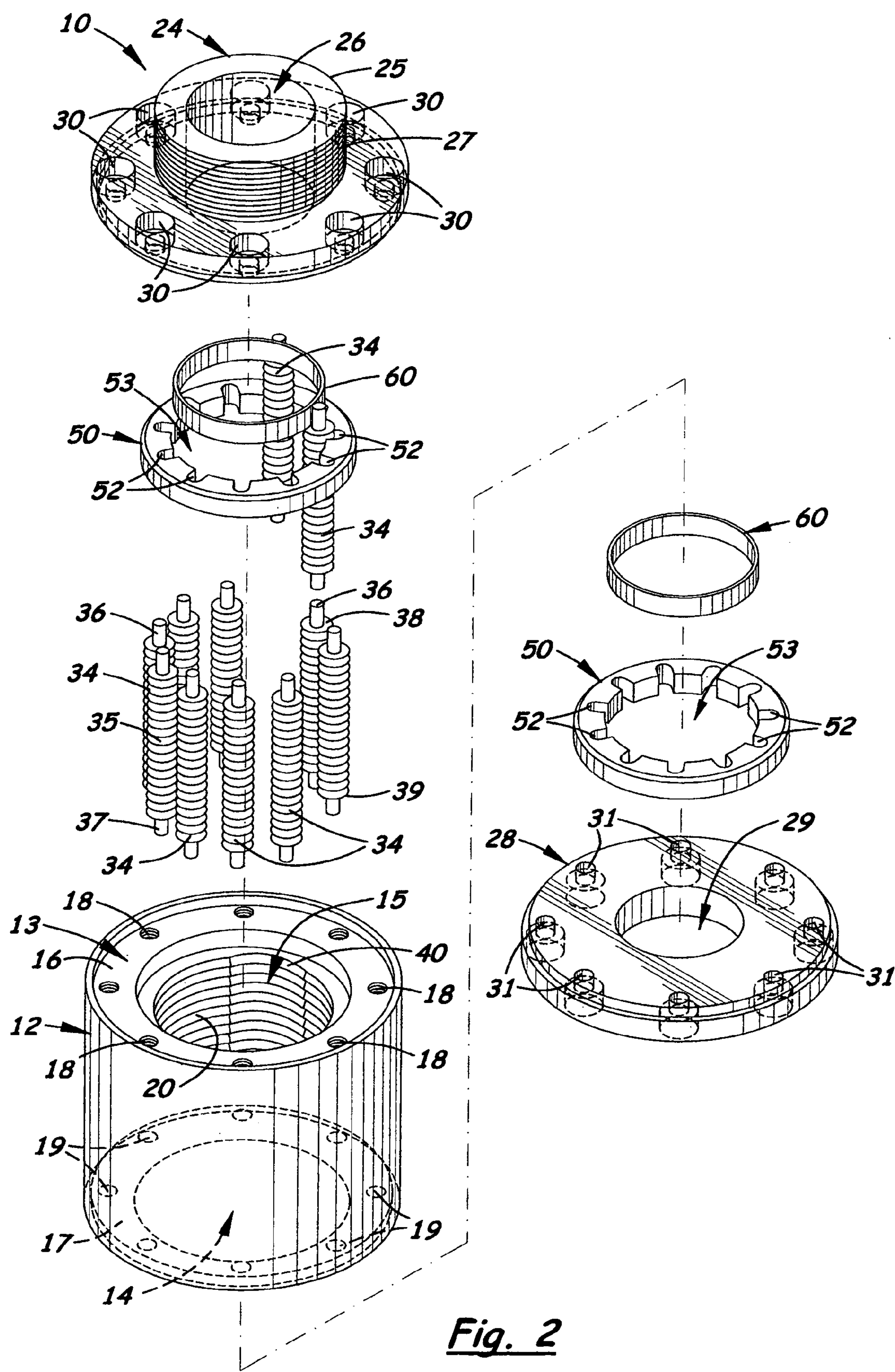
FIG. 2 is an exploded, perspective view of the invention shown in FIG. 1.
Figure 3:
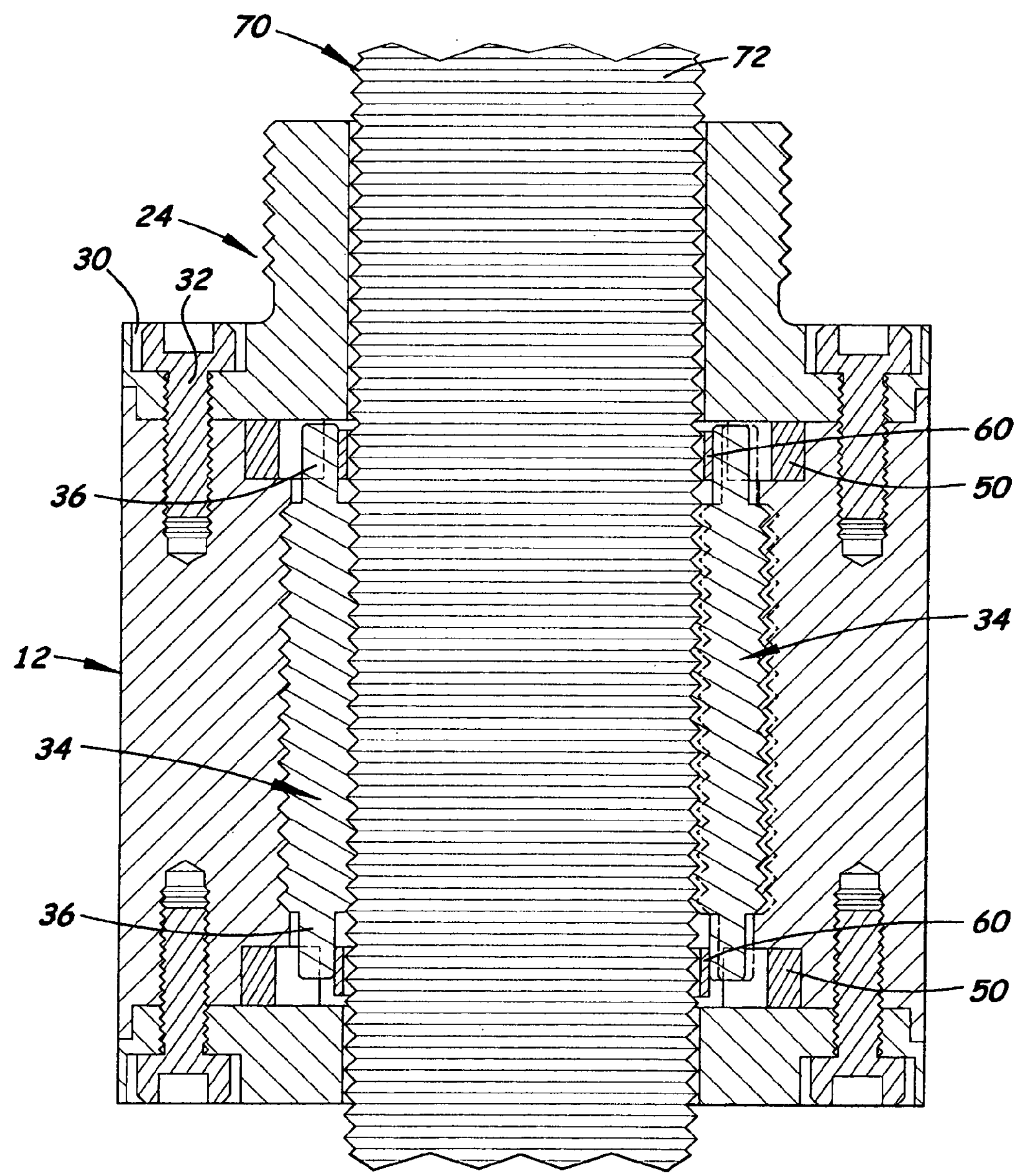
FIG. 3 is a sectional, side elevational view of the invention shown in FIGS. 2 and 3.

In the first embodiment shown in FIG. 2, the nut body 12 is cylindrical with top and bottom openings 13, 14 and a longitudinally aligned center bore 15. The length of the center bore 15 is less than the thickness of the nut body 12 thereby creating counter-sunk flange surfaces 16, 17 around the top and bottom openings 13, 14, respectively.

Selectively attached over the top and bottom openings 13, 14 is a removable top and bottom end cap 24, 28, respectively. The top end cap 24 includes a longitudinally aligned neck 25 with external threads 27 formed thereon. Both the top and bottom end caps 24, 28 include a non-threaded center bore 26, 29, respectively, designed to slide over the shaft 70 that connects to the nut body 12. A plurality of small bores 30, 31 are radially aligned around the perimeter edges of the end caps 24, 28, respectively, that receive threaded connectors 32 that extend into threaded bores 18, 19 formed on the flanges 16, 17, respectively, of the nut body 12. During assembly, the threaded connectors 32 (see FIG. 1) are used to selectively attach the top and bottom end caps 24, 28 to the nut body 12.

Located inside the nut body 12 is a plurality of longitudinally aligned rollers 34. Each roller 34 includes a plurality of non-helical grooves 35, two opposite axles 36, 37 and two opposite shoulders 38, 39. The rollers 34 may be of various lengths with various groove counts and shapes as dictated by load capacity requirements and manufacturing cost issues.

During use, the rollers 34 are radially aligned inside the center bore 15 of the nut body 12. In order to ensure that the rollers 34 do not become skewed or driven out of axial alignment between the nut body 12 and the shaft, a ring spacer 50 is provided. The ring spacer 50 is located under each end cap 24, 28 and over the shoulders 38, 39 of the rollers 34. The ring spacer 50 is used to keep the rollers 34 circumferentially spaced apart inside the center bore 15 of the nut body 12. The ring spacer 50 includes a center bore 53 and a plurality of semi-circular receiving elements 52 formed around its perimeter edge designed to receive an axle 36 or 37 on one roller 34. The axles 36, 37 on each roller 34 are sufficient in length to extend through the semi-circular receiving element 52 and terminate slightly above the ring spacer 50.

Figure 4:
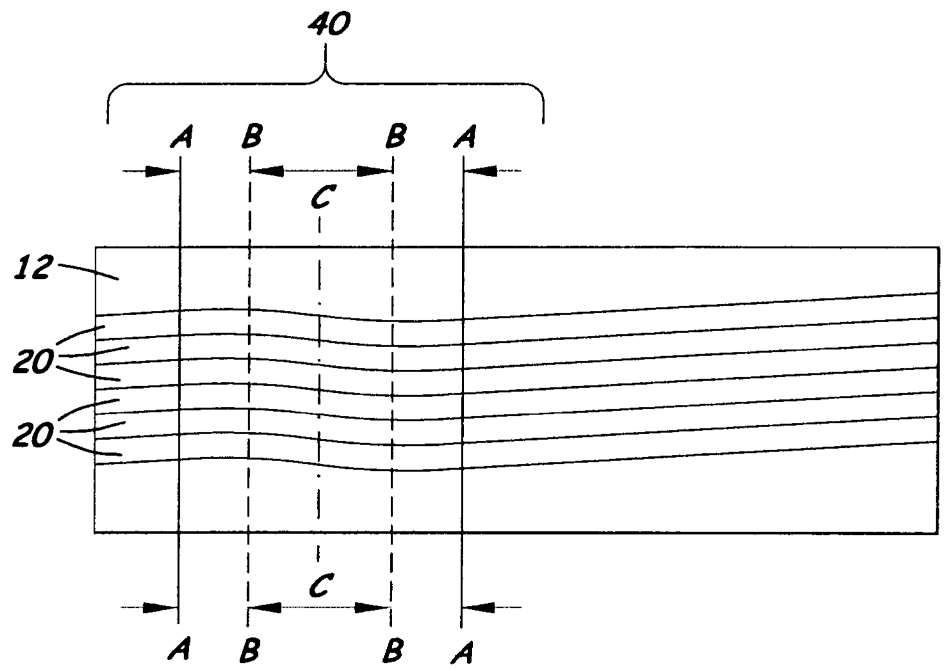
FIG. 4 is a side elevational view of the grooves formed on the cross-over region of the nut body.
Figure 5:
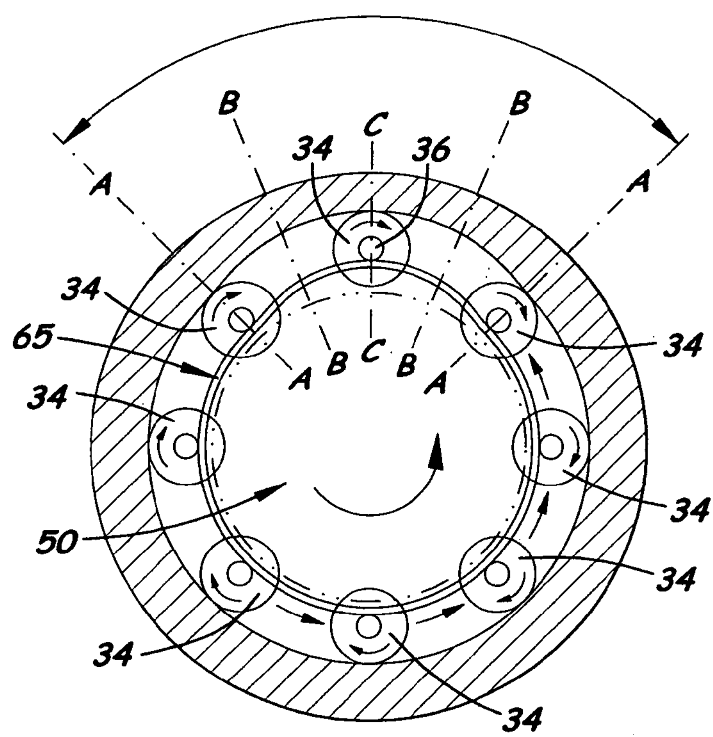
FIG. 5 is a top plan view of the nut body with the first end cap removed showing the relative location and movement of the rollers around the shaft and the relative location of the compression ring between the axles and the shaft.
Figure 6:
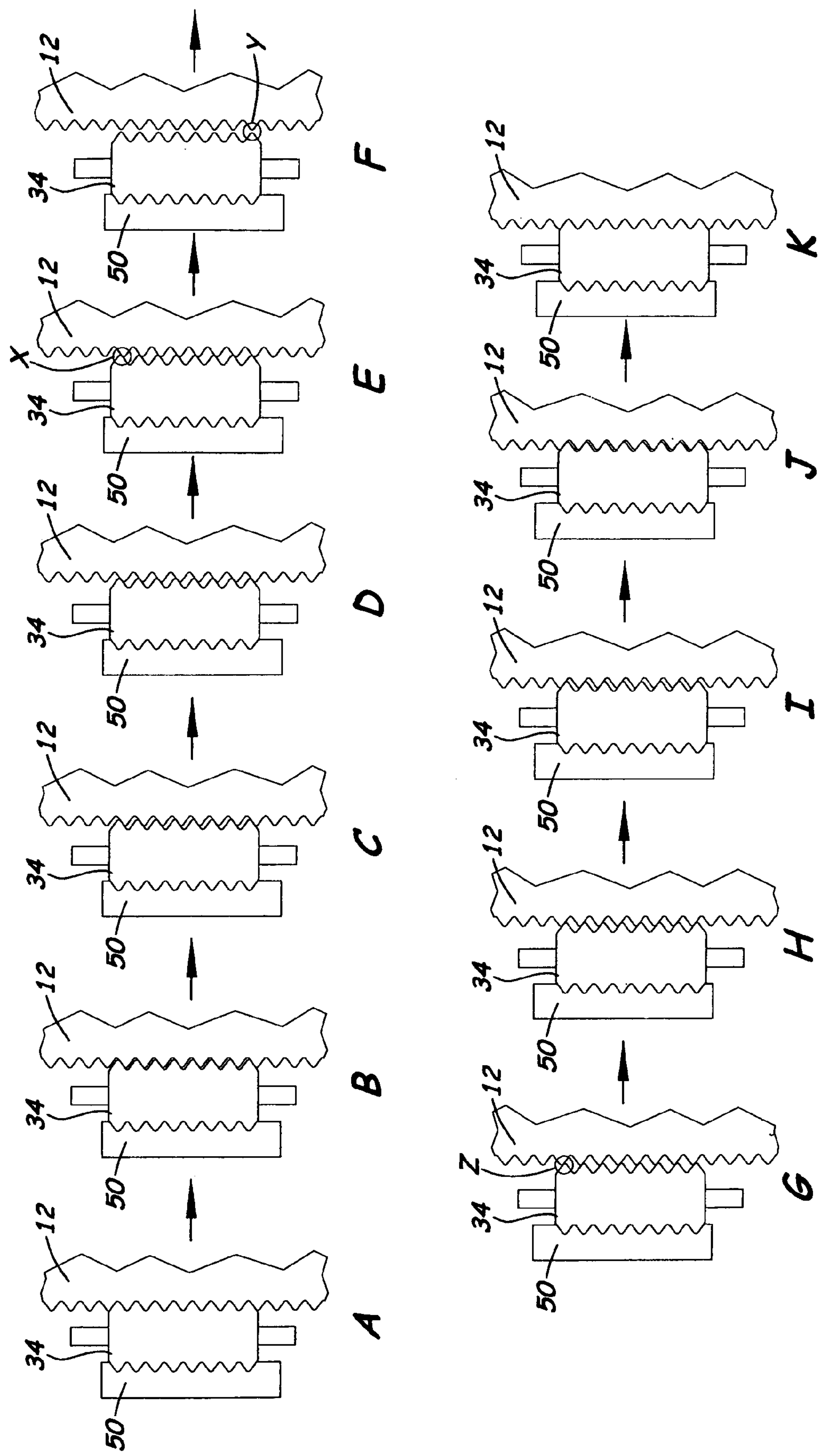
FIGS. 6A–6K are illustrations showing the sequential movement of the nut body, a roller, and the shaft.

As shown in FIG. 4, the grooves 42 in the cross-over section 40 are sufficiently extended upward so that the grooves 35 in the rollers 34 return to their start position. As the shaft 70 rotates, the grooves 35 in the rollers 34 continuously engage the grooves 20 in the nut body 12. When the grooves 35 in the roller 34 travel in the cross-over region 40, they progressively disengage from the shaft 70. In the embodiment shown in FIG. 5, the cross-over section 40 is contained within approximately a 90 degree arc. It should be understood, however, that the cross-over sections used with different sized nut bodies may be contained in other fractions of 360 degrees, depending on various load capability and manufacturing cost requirements.

Also located inside the end caps 24, 28 and disposed inside the center bore 53 on the ring spacers 50 is a compression ring 60. During use, the compression ring 60 presses against the axles 36, 37 outward to provide a constant radially outward force on the ends of the rollers 34. This force maintains the grooves 35 in the rollers 34 in constant engagement with the grooves 20 in the nut body 12.

FIGS. 6A–6F are illustrations that more clearly show the progressive disengagement and re-engagement of the grooves 20 in the nut body 12, the threads 72 on the shaft 70, and the grooves 35 on the rollers 34. Note that when the rollers 34 are in positions shown in FIGS. 6E, F, and G (denoted points X, Y, and Z, respectively) it is essential to ensure clearance between the rollers 34 and shaft 70 at the points of disengagement, cross-over region, and re-engagement. At these three points, X, Y, and Z, a free-body diagram analysis of the nut body 12, rollers 34 and shaft 70 reveals that, in the absence of any additional or external forces, there is no force causing the rollers 34 to maintain complete engagement in the nut body 12. Studies conducted by the inventor have shown that failure to maintain complete engagement in the nut body 12 may result in jamming and failed operation.

Figure 7:
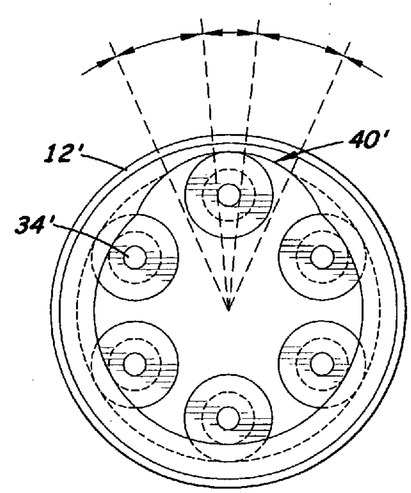
FIG. 7 is a top plan view of another embodiment of the system that uses six larger rollers disposed inside a modified nut body.

Shown in FIG. 7 is a nut body 12' space that includes six rollers 34' with larger diameters and shorter lengths than the rollers 34 shown in FIG. 2. Note that the cross-over region 40' space, formed in the grooves on the internal surface of the nut body 12', are modified to accommodate the larger diameter rollers 34'.

As mentioned above, one function of the two compression rings 60 is to force the opposite ends of the rollers 34 outward so that the grooves 35 continuously engage the grooves 20 on the nut body 12. During operation, however, it should be noted that the compression rings 60 also press tightly against the axles on the opposite ends of the rollers 34. When the shaft 70 is rotated, the compression rings 60 rotate on the roller axles 34 in the same direction as the shaft 70 while the rollers 34 rotate in the opposite direction. As a result, the compression ring 60 and the axles 36, 38 on the rollers 34 experience only rolling friction rather than sliding friction.

Figure 8:
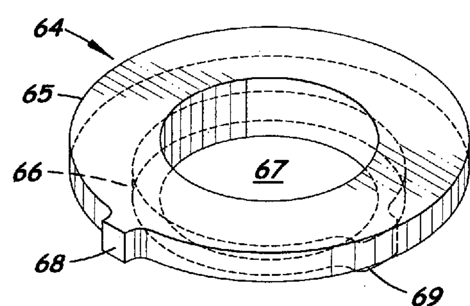
FIG. 8 is a perspective view of a cam ring.
Figure 9:
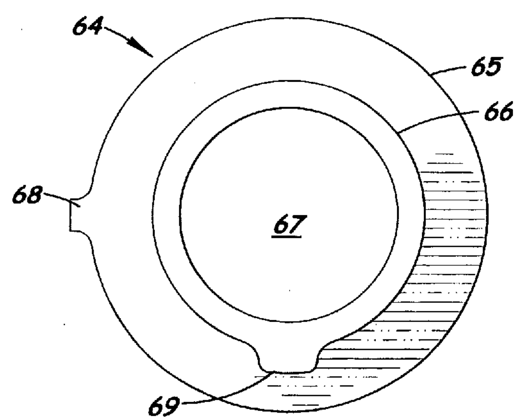
FIG. 9 is a bottom plan view of the cam ring shown in FIG. 8.
Figure 10:
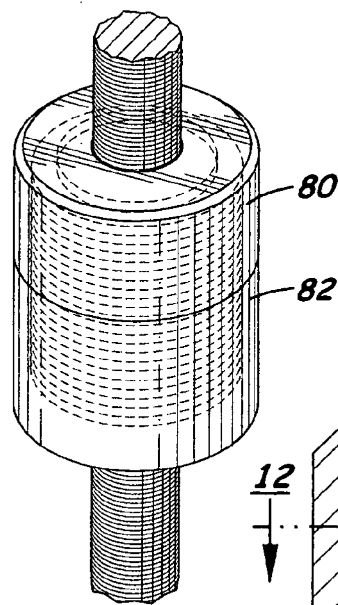
FIG. 10 is a perspective view of the second embodiment of the system that uses two end covers that connect to external threads on the nut body.
Figure 11:
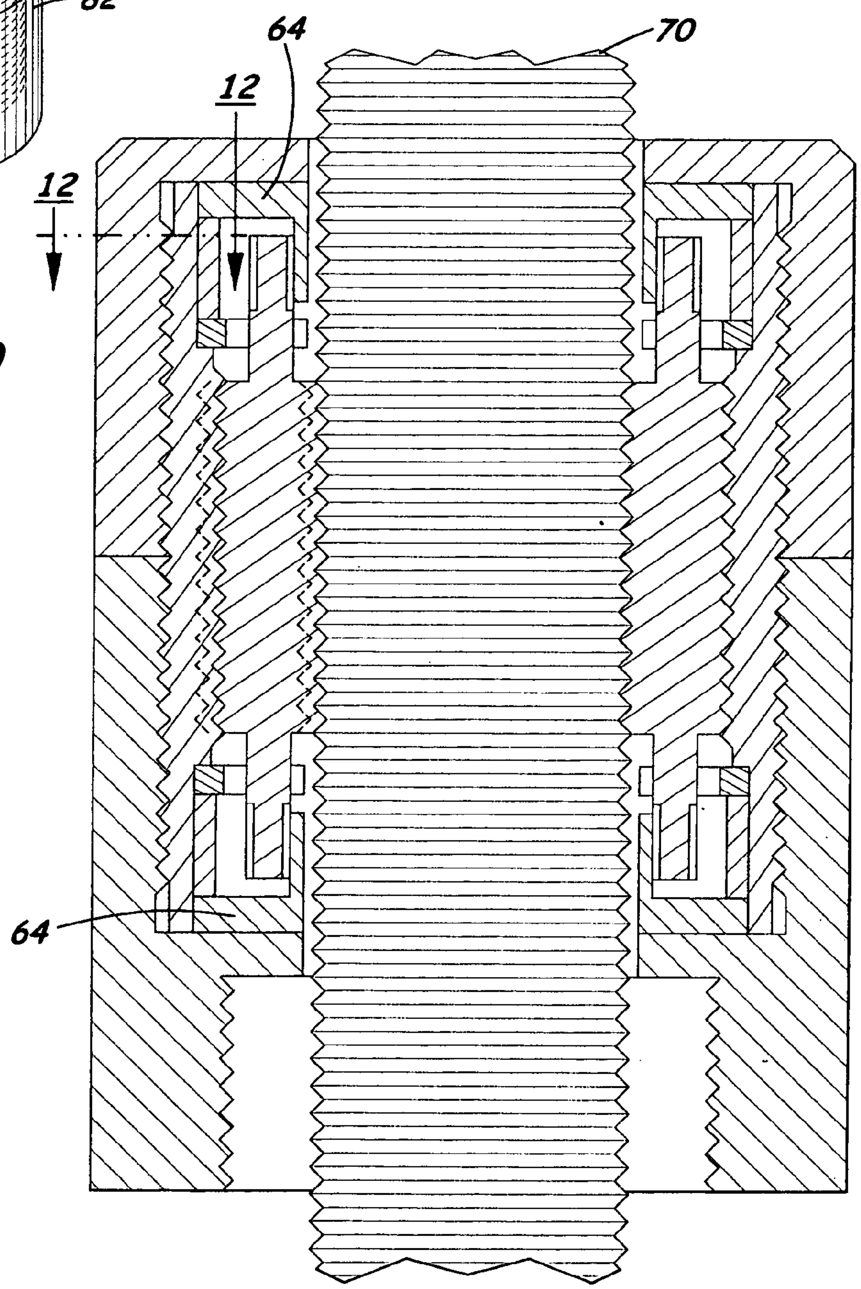
FIG. 11 is a sectional side elevation view of a second embodiment shown in FIG. 10 showing two cam rings located on opposite ends of the rollers that are used in place of the two compression rings in the first embodiment shown in FIGS. 1–3.
Figure 12:
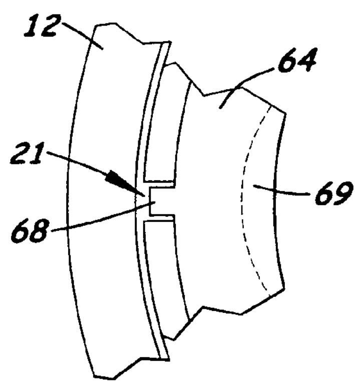
FIG. 12 is a partial, top plan view taken along line 12—12 in FIG. 11 showing the lobe region on one cam ring engaging a keyway formed on the nut body.

Another means to ensure the radial displacement of the rollers 34 is the use of a cam ring 64 as shown in FIGS. 8 and 9. The cam ring 64 includes upper ring element 65 with a short cylindrical neck 66. Formed inside the cam ring 64 is a non-threaded bore 67 through which the shaft 70 extends. Formed on the outer surface of the upper ring element 15 is a key 68 designed to engage a keyway 21 formed on the inside surface of the nut body 12 shown more clearly in FIG. 12. When the key 68 engages the keyway 21, the cam ring 64 is locked in position inside the nut body 12.

Formed on the outer surface of the neck 66 is a lobe region 69 designed to press against the roller axle 36 when the roller 34 is progressing through the cross-over region 40. During assembly, the cam ring 64 is located over the ends of the axles 36 so that the lobe region 40 presses against the axles 36 towards the cross-over region 40 in the nut body 12'. During operation, the lobe region 69 forces the adjacent axle 36 outward to follow the grooves 20 in the cross-over region 40 to completely disengage the axle 36 from the shaft 70.

As shown in FIGS. 11 and 13–15, the second embodiment of the nut body 12' with external threads 79 that connect to internal threads 81, 84 located inside two end covers 80, 82, respectively. Each end cover 80, 83 includes a center bore 82, 85, that enables the shaft 70 to extend through. During assembly, the end covers 80, 82 are tightened around the nut body 12' thereby retaining the various components therein.

Figure 13:
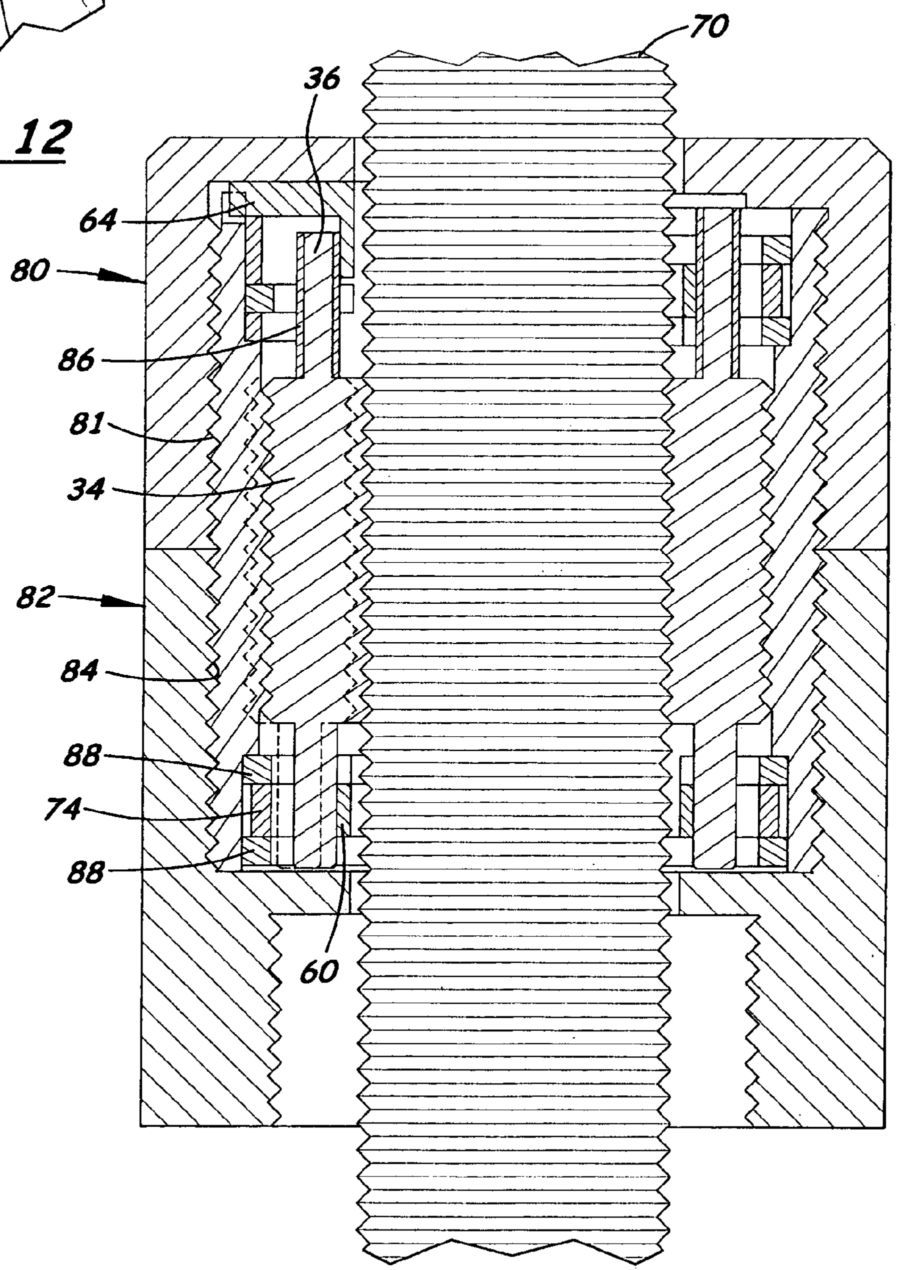
FIG. 13 is a sectional side elevation view of a third embodiment of the system showing anti-friction bushings disposed around the upper roller axles to minimize friction between rollers and the lobe region of the cam ring.
Figure 14:
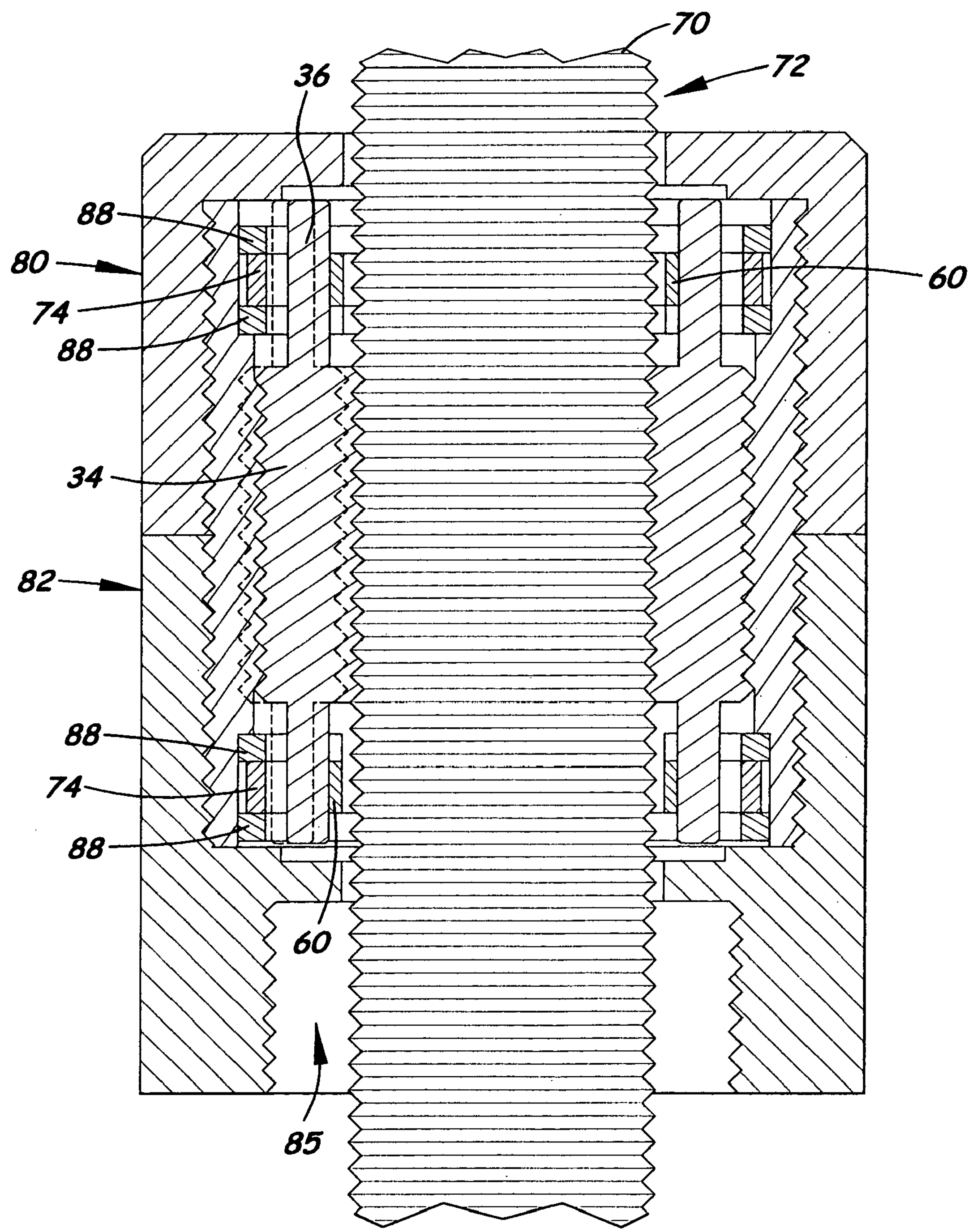
FIG. 14 is an exploded perspective view of a fourth embodiment of the invention that uses two pairs of slotted spacer rings to control circumferential spacing of the rollers inside the nut body and a compression ring located between the spacer rings on opposite axles that maintain proper orientation of the rollers inside the nut body.
Figure 15:
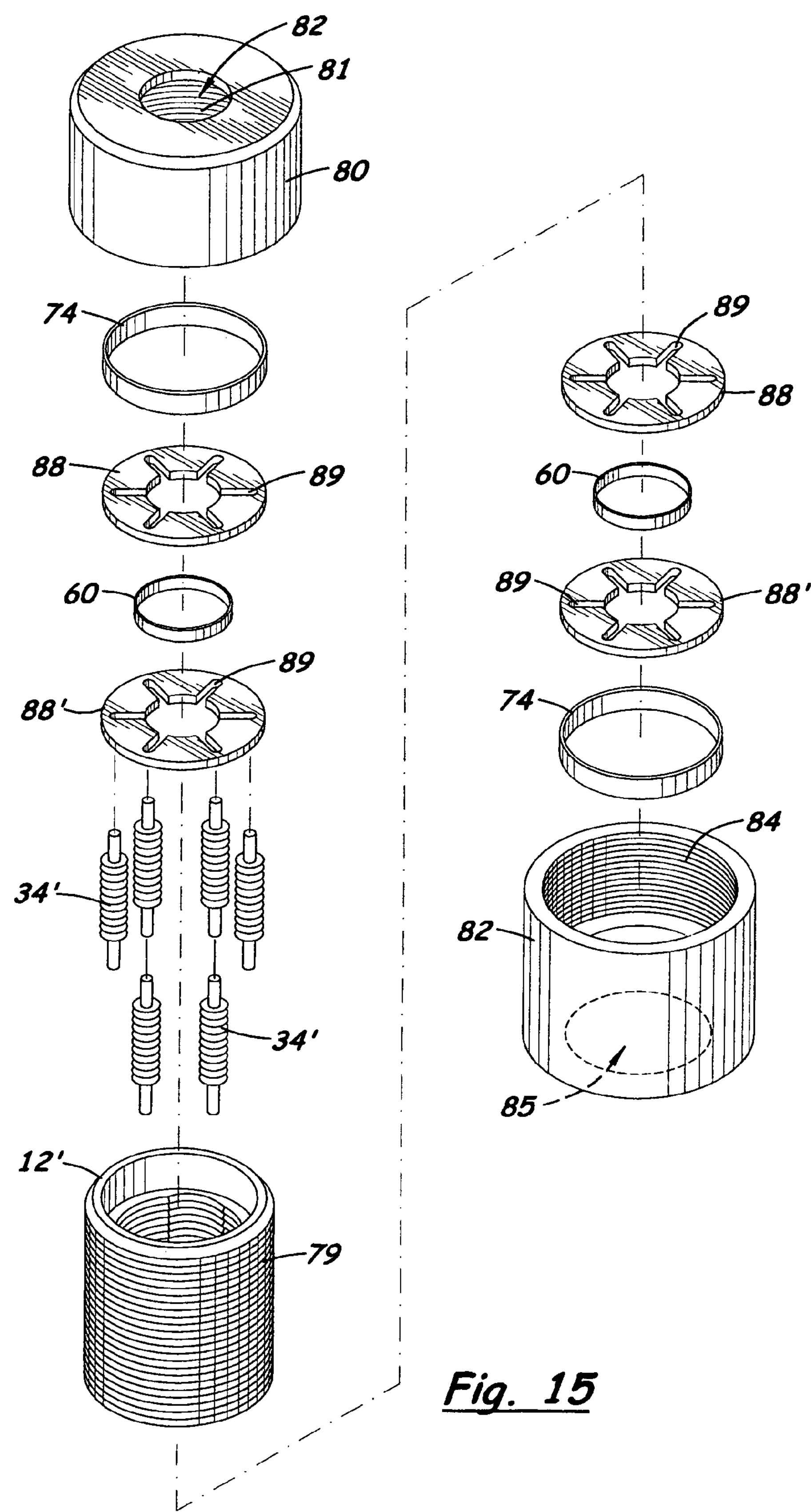
FIG. 15 is a sectional side elevational view of a fourth embodiment shown in FIG. 14.

Also as shown in FIGS. 13–15, the system 10 includes two pairs of ring spacers 88, 88' located at opposite ends of the rollers 34' (lower ends shown only in FIG. 13) to provide sufficient outward force onto the rollers 34' and the compression rings 60. The advantage of using two ring spacers 88 and 88' is that they stabilize the rollers 34' to prevent racking or misalignment in the annular space formed between the shaft exterior surface and the interior surface of the nut body 12'. Additionally, when the compression ring 60 is confined between the two ring spacers 88, 88', it is prevented from moving upward and over the shoulder on the end of the rollers 34.

Also shown in FIG. 13, optional anti-friction bushings 86 may be disposed over the roller axles 36. During use, the anti-friction bushings 86 contact the cam ring 64 rather than the surface of the roller axle 36 thereby reducing friction between the roller axle 36 and the lobe region 69 on the cam ring 64.

FIGS. 14 and 15 disclose the use of one separator ring 74 sandwiched between two ring spacers 88, 88' and one compression ring 60 disposed over the ring spacer 88 or 88'. The 89, 89' slots formed in the ring spacer 88, 88', respectively, retain the axles 34 while the compression ring 60 forces the roller axles 36 outward.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

We claim:

1. A roller screw system, comprising:

a. a cylindrical nut body with a center bore, said center bore having internal helical grooves and a circumferentially extending cross-over region wherein said helical grooves extend radially outward and extend axially;

b. a shaft with external helical threads formed thereon, said shaft being disposed inside said center bore of said nut body;

c. a plurality of rollers disposed inside said center bore and aligned radially around said shaft, each said roller including a plurality of non-helical grooves formed thereon capable of engaging said helical grooves on said nut body; and, d. means for continuously forcing said rollers outward to engage said non-helical grooves on said rollers against said helical grooves in said crossover region as said nut body and said shaft are rotated relative to each other.

2. The roller screw system, as recited in claim 1, wherein said means for continuously forcing said rollers outward includes at least one compression ring located inside said nut body and around said shaft, said compression ring being located inside said rollers thereby forcing said rollers outward towards said nut body.

3. The roller screw system, as recited in claim 2, further including two ring spacers located around said shaft and said axles, said ring spacer being stacked above and below said compression ring to confine said compression ring on said rollers.

4. The roller screw system, as recited in claim 1 wherein said means for forcing said rollers outward are two compression rings located around said shaft and inside said nut body, said compression rings being located near the opposite ends of said rollers and centrally to said rollers located inside said rollers thereby forcing said rollers outward towards said nut body.

5. The roller screw system, as recited in claim 4, further including each said roller including two opposite axles upon which said compression rings act against to force said rollers outward.

6. The roller screw system, as recited in claim 5, further including at least one ring washer located inside said nut body and disposed around said shaft, said ring washer including a plurality of radially aligned, semi-circular receiving elements each capable of receiving one said axle on said roller, said semi-circular receiving elements including an inside opening enabling said axle to be slidingly received to radially aligned on said ring washer around said shaft.

7. The roller screw system, as recited in claim 1, further including two removable end caps selectively attached to said nut body, each said end cap includes a center bore through which said shaft extends.

8. The roller screw system, as recited in claim 1, further including exterior threads formed on said nut body and a pair of threaded end covers that connect to said nut body to retain said rollers therein.

9. The roller screw system, as recited in claim 1, wherein said means for continuously forcing said rollers outward to engage said cross-over region on said nut body is a cam ring located around said shaft and said axles on said rollers, said cam ring including means to couple said cam ring to said nut body to prevent rotation therein and a lobe region aligned on said cam ring to force said rollers into contact with said cross-over region as said nut body and said shaft are rotated relative to each other.

10. The roller screw system, as recited in claim 9, further including a bushing located around each said axle to reduce friction between said axle and said cam ring.

11. The roller screw system, as recited in claim 10, further including at least one separator ring disposed around said shaft, said separator ring containing a plurality of slots each capable of receiving one said axle to maintain the spacing of said roller inside said nut body.

12. A roller screw system, comprising:

a. a cylindrical nut body with a center bore, said center bore having internal helical grooves and a circumferentially extending cross-over region wherein said helical grooves extend radially outward and extend axially;

b. a shaft with external helical threads formed thereon, said shaft being disposed longitudinally inside said center bore of said nut body;

c. a plurality of rollers disposed inside said center bore and aligned radially around said shaft, each said roller including two opposite axles and a plurality of non-helical grooves formed thereon capable of engaging said helical grooves on said nut body; and, d. at least one compression ring located inside said nut body and around said shaft, said compression ring being located inside said rollers and press against said axles on said rollers to continuously force said rollers outward so that said non-helical grooves on said rollers maintain engagement with said helical grooves on said cross-over region on said nut body as said nut body and said shaft are rotated relative to each other.

13. The roller screw system, as recited in claim 12, further including two ring spacers located around said shaft and said axles, said ring spacer being stacked above and below said compression ring to confine said compression ring on said rollers.

14. The roller screw system, as recited in claim 12, further including two removable end caps selectively attached to said nut body, each said end cap includes a center bore through which said shaft extends.

15. The roller screw system, as recited in claim 12, further including exterior threads formed on said nut body and a pair of threaded end covers that connect to said nut body to retain said rollers therein.

16. The roller screw system, as recited in claim 12, further including a bushing located around each said axle to reduce friction between said axle and said cam ring.

17. A roller screw system, comprising:

a. a cylindrical nut body with a center bore, said center bore having internal helical grooves and a circumferentially extending cross-over region wherein said helical grooves extend radially outward and deflect axially;

b. a shaft with external helical threads formed thereon, said shaft being disposed longitudinally inside said center bore of said nut body;

c. a plurality of rollers disposed inside said center bore and aligned radially around said shaft, each said roller including two opposite axles and a plurality of non-helical grooves formed thereon capable of engaging said helical grooves on said nut body; and, d. at least one cam ring for continuously forcing said axles on said rollers outward to engage said cross-over region on said nut body, said cam ring being located around said shaft and said axles on said rollers, said cam ring including means to couple said cam ring to said nut body to prevent rotation therein and a lobed region aligned on said cam ring to force said rollers into contact with said helical grooves in said cross-over region as said nut body and said shaft are rotated relative to each other.

18. The roller screw system, as recited in claim 17, further including at least one separator ring disposed around said shaft, said separator ring containing a plurality of slots each capable of receiving one said axle to retain said roller inside said nut body.

* * * * *